(12) United States Patent
Kossowan

(10) Patent No.: US 8,037,617 B2
(45) Date of Patent: Oct. 18, 2011

(54) CONTAMINATED SOIL REMEDIATION APPARATUS

(75) Inventor: Russell Gary Kossowan, Cochrane (CA)

(73) Assignee: Russell Gary Kossowan, Cochrane, Alberta (CA)

( * ) Notice: Subject to any disclaimer, the term of this patent is extended or adjusted under 35 U.S.C. 154(b) by 752 days.

(21) Appl. No.: 11/804,663

(22) Filed: May 18, 2007

(65) Prior Publication Data

US 2008/0240862 A1  Oct. 2, 2008

(30) Foreign Application Priority Data

Mar. 26, 2007  (CA) ...................................... 2582801

(51) Int. Cl.
*F26B 19/00* (2006.01)
(52) U.S. Cl. ......... 34/61; 34/77; 34/78; 34/181; 34/203; 34/208; 34/219; 34/235
(58) Field of Classification Search ............... 34/61, 72, 34/77, 78, 82, 168, 169, 177, 178, 179, 181, 34/203, 208, 209, 212, 219, 223, 235
See application file for complete search history.

(56) References Cited

U.S. PATENT DOCUMENTS

| | | | |
|---|---|---|---|
| 2,043,265 A | 6/1936 | Roeder | |
| 3,160,443 A * | 12/1964 | Harris et al. | 406/85 |
| 3,370,358 A * | 2/1968 | Esser et al. | 34/368 |
| 4,304,508 A * | 12/1981 | Wolf | 406/78 |
| 5,228,804 A | 7/1993 | Balch | |
| 5,236,282 A | 8/1993 | Teasel et al. | |
| 5,557,858 A * | 9/1996 | Macaluso et al. | 34/273 |
| 5,563,066 A | 10/1996 | Buchanan | |
| 5,591,635 A * | 1/1997 | Young et al. | 435/286.1 |
| 5,942,022 A | 8/1999 | Bislev et al. | |
| 6,534,306 B1 | 3/2003 | Allen | |
| 6,543,963 B2 | 4/2003 | Bruso | |
| 6,551,026 B2 * | 4/2003 | Cerea | 405/128.8 |
| 6,789,353 B2 * | 9/2004 | Smullen et al. | 47/1.42 |
| 2004/0221480 A1 * | 11/2004 | Greimel et al. | 34/618 |
| 2004/0240942 A1 | 12/2004 | Richter | |

FOREIGN PATENT DOCUMENTS

| | | |
|---|---|---|
| EP | 0405067 | 2/1991 |
| EP | 0891799 | 1/1999 |
| JP | 2003-103249 | 4/2003 |
| JP | 2003-340425 | 12/2003 |

* cited by examiner

*Primary Examiner* — Jiping Lu

(74) *Attorney, Agent, or Firm* — Klarquist Sparkman, LLP

(57) ABSTRACT

A soil remediation apparatus for treating contaminated soil comprises an air deck unit and a remediation unit. The air deck unit comprises an enclosure with a contaminated soil inlet and a remediated soil outlet; at least one conveyor located inside the enclosure and operable to convey soil from the enclosure inlet to the enclosure outlet; and contaminated air extraction means having an inlet in fluid communication with the enclosure and an outlet, and operable to extract air from the air deck unit.

6 Claims, 7 Drawing Sheets

CONTAMINATED SOIL REMEDIATION APPARATUS

CROSS-REFERNCE TO RELATED APPLICATION

The present application claims priority to Canadian Application No. 2,582,801 entitled "Contaminated Soil Remediation Apparatus," filed Mar. 26, 2007, which is incorporated herein by reference.

FIELD

The present invention relates generally to treatment of contaminated soil or material that contain organic compounds such as but not limited to hydrocarbons, and particularly to an apparatus for remediation of such soil or material.

BACKGROUND

Impacted soils occurring from industrial applications and upstream and downstream oilfield activities are becoming an increasing concern. Due to a growing population, public pressure, and environmental awareness, oil companies and industrial firms are exploring quality and cost effective approaches for cleaning up contaminated sites having such impacted soils.

Bioremediation of contaminated soils is a popular and affordable approach for treatment of most soil types and for most contaminates. For example, bio-remediation has been employed to treat hydrocarbon-impacted oilfield well sites. Bioremediation has become increasingly popular as technological advancements have made bioremediation cost-effective, and older treatment methods such as land-filling have fallen out of favor.

While Bio-piles, land farms and introduction of bacterium have been popular approaches to bio-remediation, these passive operations are typically slow-acting and can take years to remediate a contaminated site. These operations also disadvantageously require a large amount of space as soil must be excavated, piled offsite, then have a passive or active aeration system installed thereon.

Other known methods for treating contaminated soils include using an active mixing action that passes soil through air. Such bioremediation methods include use of an Allu™ bucket or windrow turners (large rototillers) to contact the contaminated soil. One disadvantage of using Allu™ buckets or rototillers is that when the soil is treated, the contaminant vapors are liberated and escape into the air. Rototillers have the further disadvantage of only being able to treat a relatively thin layer of soil at the surface of a contaminated site. Also, both approaches require relatively dry and unfrozen conditions in order to be effective.

Another known method for treating contaminated soils is thermal desorption which actively heats the soil to a temperature which incinerates contaminated particles within the soil. Disadvantageously, this treatment tends to destroy the chemical components and structure of the soil, essentially turning the soil into ash thereby making the soil an unsuitable environment for organic growth.

Recently public pressure and legislation such as the Alberta Energy Board's Directive 58 has created a need to provide an efficient and cost-effective solution for remediating and treating contaminated soil in such a way that does not cause contaminants in the soil to be released into the air.

It is therefore desirable to provide an apparatus that solves at least some of the problems of the prior art.

SUMMARY

It is an object of the invention to provide an apparatus for treating contaminated soils or other organic compound containing materials.

According to one aspect, there is provided a soil remediation apparatus comprising a component for volatilizing contaminated soil ("Air deck unit"). The air deck unit comprises:
  (a) an enclosure with a contaminated soil inlet and a remediated soil outlet;
  (b) at least one conveyor located inside the enclosure and operable to convey soil from the enclosure inlet to the enclosure outlet;
  (c) air recirculation means having an inlet and outlet in fluid communication with the enclosure, and operable to extract and discharge air from and into the enclosure, thereby volatilizing contaminant vapours trapped therein; and
  (d) contaminated air extraction means having an inlet in fluid communication with the enclosure and an outlet, and operable to extract air from the air deck unit.

The soil remediation apparatus can further comprise a remedial device for remediating the extracted contaminated air. The remedial device can be a biofilter unit fluidly coupled to the outlet of the contaminated air extraction means and operable to bioremediate contaminated air received from the air deck unit.

The air recirculation means can include at least one nozzle coupled to the outlet and directed at directed at the conveyor such that air is discharged at the soil, thereby aerating the soil and volatilizing contaminants trapped therein. The air recirculation means can further comprise a suction hood fluidly coupled to an opening in the enclosure, an air header fluidly coupled to the suction hood, at least one air duct fluidly coupled to the air header, at least one nozzle header fluidly coupled to the air duct, at least one nozzle fluidly coupled to the nozzle header, and a blower fluidly coupled to at least one of these components and operable to extract air from the enclosure via the suction hood and return the air back into the enclosure through the nozzle. The nozzle can be located in sufficient proximity to the conveyor that the nozzle will contact at least some soil conveyed along the conveyor such that the contacted soil is agitated and vapor trapped therein are volatilized. That is, when the conveyor is conveying the soil, the nozzle will plow through the soil. Multiple nozzles can be provided in the Air deck unit. The nozzles can be grouped in to one or more nozzle assemblies; each nozzle assembly can comprise a nozzle header fluidly coupled to the air recirculation means and multiple nozzles attached in transversely-spaced manner to the header. The nozzles can extend from the header at an angle towards the conveyor. Each nozzle assembly can be coupled to heating and/or dehumidifying means to supply heated and/or dehumidified air through the nozzles, respectively.

The soil remediation apparatus can further comprise a heating circuit located inside the enclosure and operable to heat the soil conveyed along the conveyor such that vapors trapped in the soil are volatilized.

The air deck unit can also comprise multiple conveyors arranged in a vertically spaced and stacked manner. Each conveyor is in soil communication with adjacent conveyors. The conveyors can be operated so that soil is deposited from one conveyor to another, wherein the depositing agitates the soil thereby volatilizing vapors trapped in the soil.

The contaminated air extraction means can comprise a suction hood in fluid communication with an opening in the enclosure, a blower in fluid communication with the suction hood and operable to suck contaminated air through the opening and out of the outlet in the contaminated air extraction means.

Alternatively, a single blower can be provided to extract air by the air extraction means, and to recirculate air by the air recirculation means.

DETAILED DESCRIPTION

Figure 1:
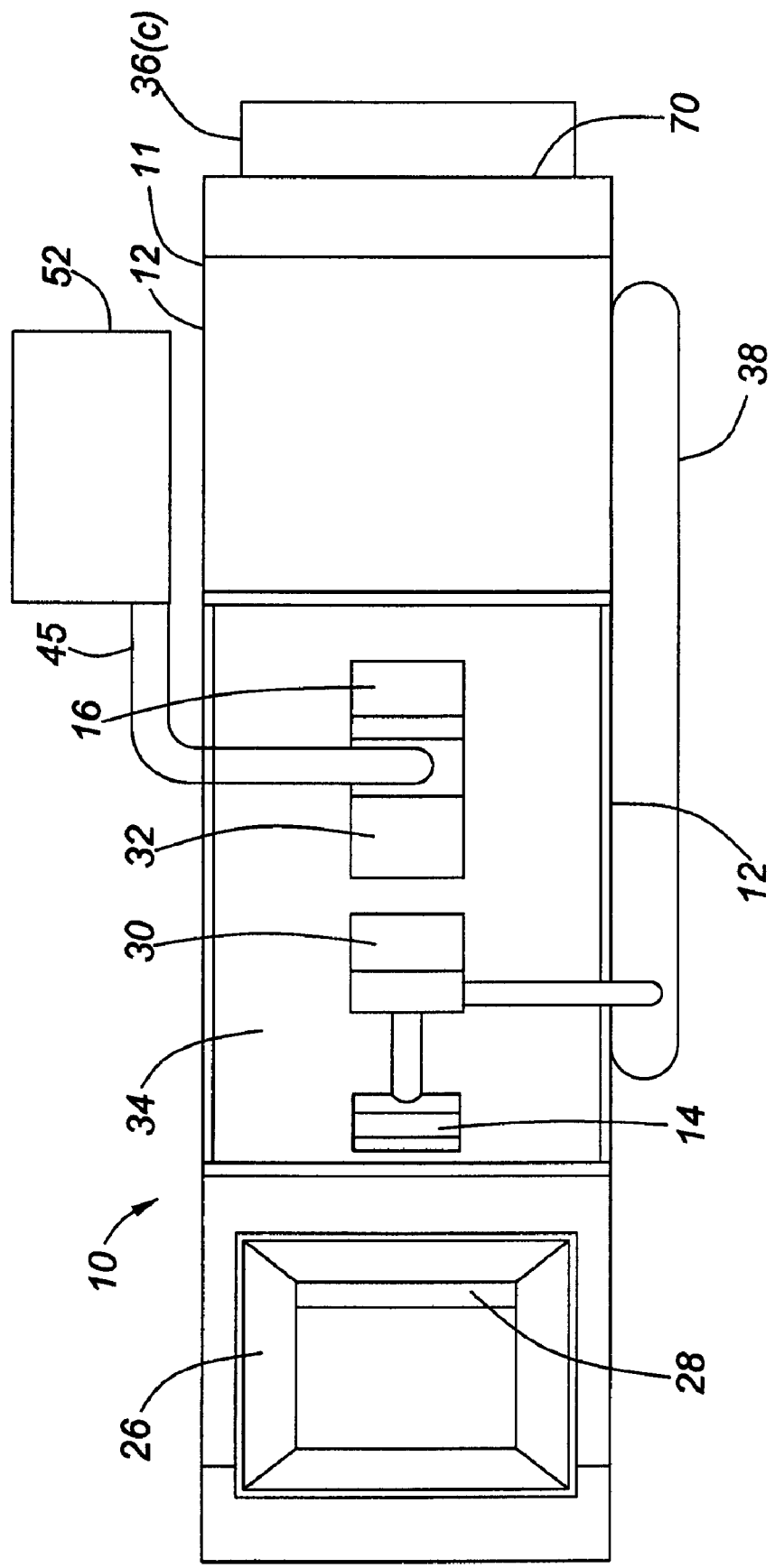
FIG. 1 is a schematic top plan view of the soil remediation apparatus according to one embodiment.

According to one embodiment, a soil remediation apparatus is provided for treating contaminated soils and other organic compound containing material (hereinafter collectively referred to as "contaminated soil"). The apparatus generally comprises a component for volatilizing contaminants from the contaminated soil ("Air deck unit") and a biofilter unit or other remedial device which remediates volatilized contaminant vapors received from the Air deck unit.

In the context of this description, the term "soil" includes but is not limited to sand, silt, clay, peat, organic material and blends thereof.

The term "contaminants" includes but is not limited to light end hydrocarbons, and can for example also refer to hydrocarbons of all phases in the C1-C40 range.

Air Deck Unit

Referring to in FIGS. 1 to 4 and 6 the air deck unit of the soil remediation apparatus is referenced by numeral 10 and comprises an enclosure 11 and components therein for volatilizing contaminated soil. Contaminated soil is loaded into the air deck unit 10 through a hopper 26 located at the top front end of the enclosure 11. The hopper 26 directs the contaminated soil onto the first of three vertically stacked and spaced conveyors 36(a)-(c). As the contaminated soil moves along the three conveyors 36(a)-(c), contaminant vapors trapped in the soil are volatilized. Volatilization is caused by the exposure of the soil to air while traveling on the conveyors 36(a)-(c), aeration, and agitation. Alternatively, the air deck unit 10 can be provided with a different number of conveyors within the scope of the invention. Optionally, the contaminated soil can be heated inside the air deck unit 10 to promote volatilization.

In the context of this application, "aerate" means to blow air at the soil, and "agitate" means to move the soil.

The air deck unit 10 is particularly suited for treating soil contaminated with hydrocarbon contaminants. Such contaminants generally exist in an unstable bond with the soil, and during transportation along the conveyor belts 36, clods in the soil are broken apart, thereby breaking the hydrocarbon bonds and releasing the hydrocarbons as a vapor. These volatilized contaminants are released into and mix with the air contained within the enclosure 11.

The following operations all contribute to the volatilization of the contaminated soils: (1) exposure of the soil to air while spread out and traveling along each conveyor belt, (2) movement of the soil from one conveyor belt to another (agitation), (2) physical contact with the nozzles (agitation), (3) blowing air through nozzles at the soil (aeration), and (4) heating by hot blown air or by other heating means within the enclosure 11.

The enclosure 11 comprises a frame 17, and roof and side panels 12 covering the frame 17 such that an enclosure is formed. The frame 17 includes lateral structural supports 18 that span the width of the frame 17 and provide structural support as well as a location for mounting components within the enclosure 11. The enclosure 11 does not have a structural floor, as the air inside the unit 10 is prevented from escaping through the bottom of the enclosure 11 by the top or upper portion of the bottom conveyor 36(c) and the side skirts 48 that are mounted to the inside of the enclosure 11 and extend down to contact the third conveyor 36(c).

The enclosure 11 formed by the panels 12 impedes the volatilized contaminants from diffusing into the atmosphere. The volatilized contaminants are instead sucked out of the enclosure 11 by an extracted air blower 32. The contaminated air is then bioremediated by the Biofilter unit, which is referenced as numeral 52 in these Figures. The enclosure 11 does not need to be air-tight. However, the enclosure 11 should be constructed so that when the extracted air blower 32 is operating, substantially all of the volatilized contaminant vapors is prevented from escaping into the environment.

A blower skid 34 is mounted on top of the enclosure 11 and comprises a structural steel frame that is held in position on the housing 10 by vertical stops on its sides and ends of the roof panel 12. The extracted air blower 32 is mounted to the frame, as well as a recirculation air blower 30, and suction hoods 14, 16 through which air is respectively extracted by the blowers 30, 32. The suction hoods 14, 16 are respectively mounted over openings in the roof sheathing 12 when the skid 34 is in place. The skid 34 is removable from the rest of the air deck unit 10, which is particularly useful to reduce the height of the air deck unit 10 during transport. Removal is facilitated by lift hooks that form part of the steel frame of the skid 34. The interface between the suction hoods 14, 16 and the roof 12 openings are sealed with compression neoprene gaskets (not shown) as is known to persons skilled in the art. The force necessary to seal the gaskets is supplied by the weight of the skid 34. The skid 34 further incorporates walkways and handrails (not shown) to facilitate access to the blowers 30, 32 for service and repair.

The skid 34 also includes a recirculation air header 38 which is coupled at an inlet end to the exhaust end of the recirculation air blower 30. A part of the header 38 hangs over one side of the enclosure 11 and has multiple air ducts 40 which extend downwards from the header 38. Each air duct 40 has a discharge end which mates with corresponding openings in the side of the enclosure 11. These openings are coupled to air nozzle headers 42 which comprise nozzles 44 aimed at the top surface of the second and third conveyors 36(b) and (c). In operation, the recirculation air blower 30 extracts air from the enclosure 11 through the suction hood 14, and discharges the air into the recirculation air header 38, which then directs the air back into the enclosure 11 through the air ducts 40, the air nozzle headers 42, and then through the air nozzles 44 and into the contaminated soil being transported on the conveyor belts 36(b) and (c). The blown air serves to aerate the soil and volatilize the contaminants trapped therein.

The recirculation air blower 30 in this embodiment utilizes an explosion-proof electric motor with a capacity of up to 25,000 ft$^3$/min, with a nominal capacity of approximately 15,000 ft$^3$/min. This capacity is suitable for recirculating air within the housing volume, which in this embodiment is approximately 2400 ft$^3$ for an empty Air deck unit 10 (this volume would be reduced by an estimated volume of the soil of 165-220 ft$^3$ when the unit 10 is operating). The blower capacity can of course be adjusted for different housing volumes and for different factors. Such factors to be considered when selecting the capacity of the blowers 30 include the concentration of contaminants in the soil and the moisture content of the soil.

The extracted air blower 32 typically comprises a motorized explosion proof blower as is known in the art. A suitable such blower is a 10 HP blower manufactured by Twin City Fan. For this embodiment of the invention, an air exchange rate of between 1800 ft$^3$/min and 3000 ft$^3$/min has been found to be suitable. Of course, the capacity of the extracted air blower 32 can be adjusted for different housing volumes and different factors. The extracted air blower 32 can be further equipped with a variable frequency drive that controls blower speed and, consequently, rate of output. The output of the extracted air blower 32 can be controlled to vary with the mass quantity of the Biofilter unit 52 and the desired retention time of the volatilized contaminants within the Biofilter 52. In other words, the blower output can be controlled to provide suitable retention time of the contaminated air within the Biofilter unit 52; the blower output can also be adjusted to operate with different remedial devices.

The recirculation air header 38 is mounted to the exterior of the enclosure 11. Alternatively, it can be supported by structural members (not shown) attached to the blower skid 34. The air header 38 is sized such that the backpressure in the air header 38 is minimized.

Figure 2:
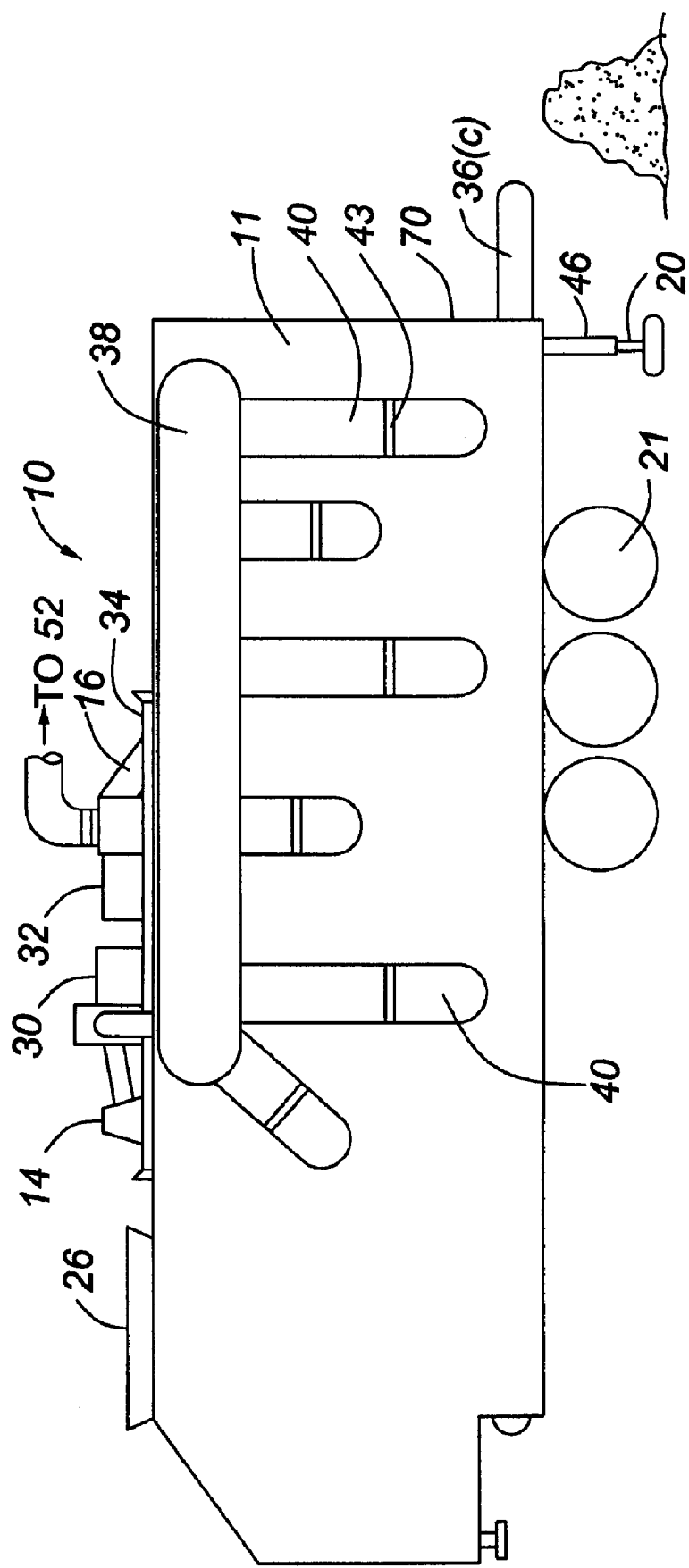
FIG. 2 is a schematic side elevation view of an Air deck unit of the soil remediation apparatus.

Referring particularly to FIG. 2, air ducts 40 are directly connected to the air header 38 and extend downwards on the outside of the enclosure 11. The nozzle headers 42 extend transversely across the inside of the enclosure 11 and penetrate the side panel of the enclosure 11 to meet with the discharge ends of the air ducts 40. The air ducts 40 channel recirculated air from the air header 38 to the air nozzle headers 42. Optionally, the air ducts 40 further comprise valves 43. The valves 43 are typically ¼ turn butterfly valves, are sized to minimize backpressure, are placed in each individual air duct 40 and allow the volume of air that reaches each air nozzle header 42 to be regulated.

The air nozzle headers 42 connect the air ducts 40 to air nozzles 44 and serve a number of purposes. First, the air nozzle headers 42 channel recirculated air from the air ducts 40 to the air nozzles 44. Additionally, the air nozzle headers 42 can be used to support optional heating pipes 24 (shown in FIG. 8). Also, the headers 42 span the entire width of the interior of the enclosure 11 and are attached to the frame extending along the inside of side panels 12 thereby providing additional structural support for the enclosure 11.

Figure 3:
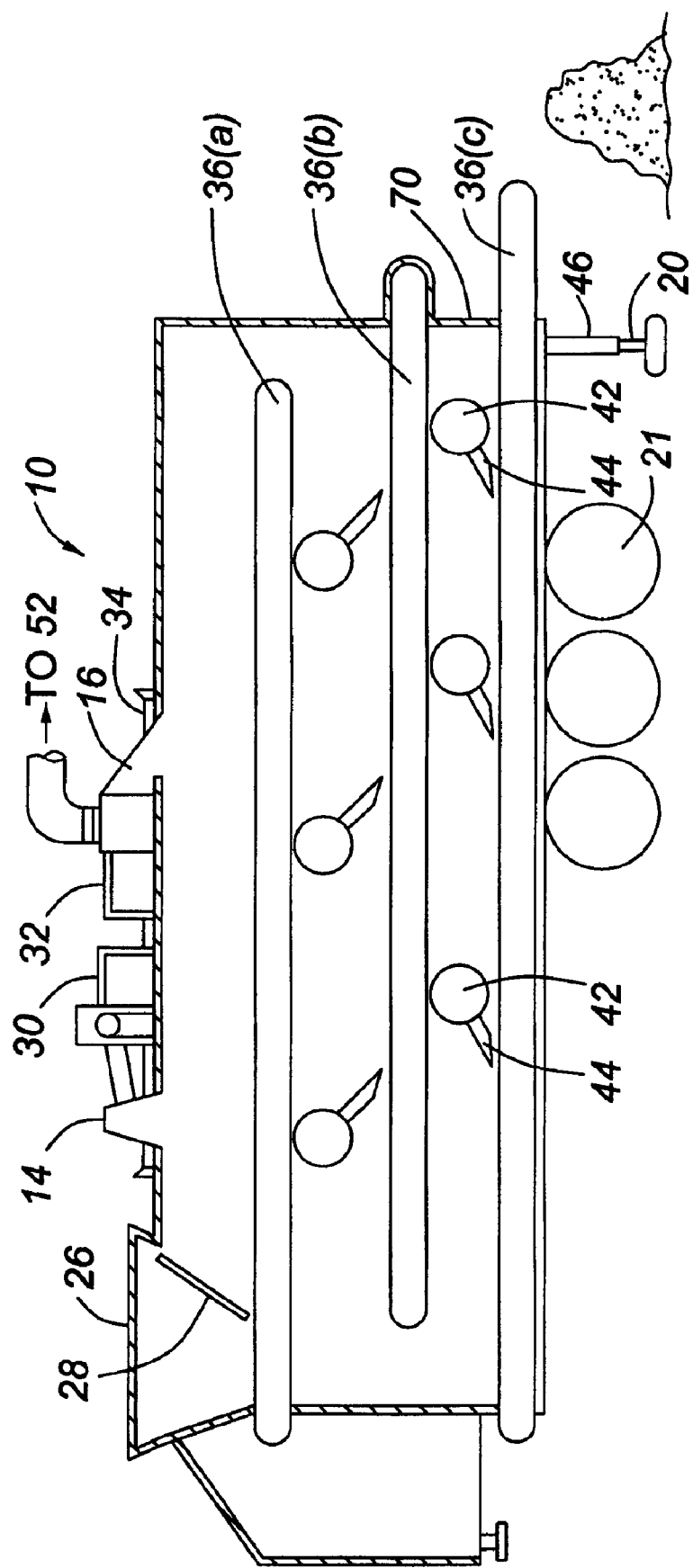
FIG. 3 is a schematic cutaway side elevation view of the Air deck unit.
Figure 4:
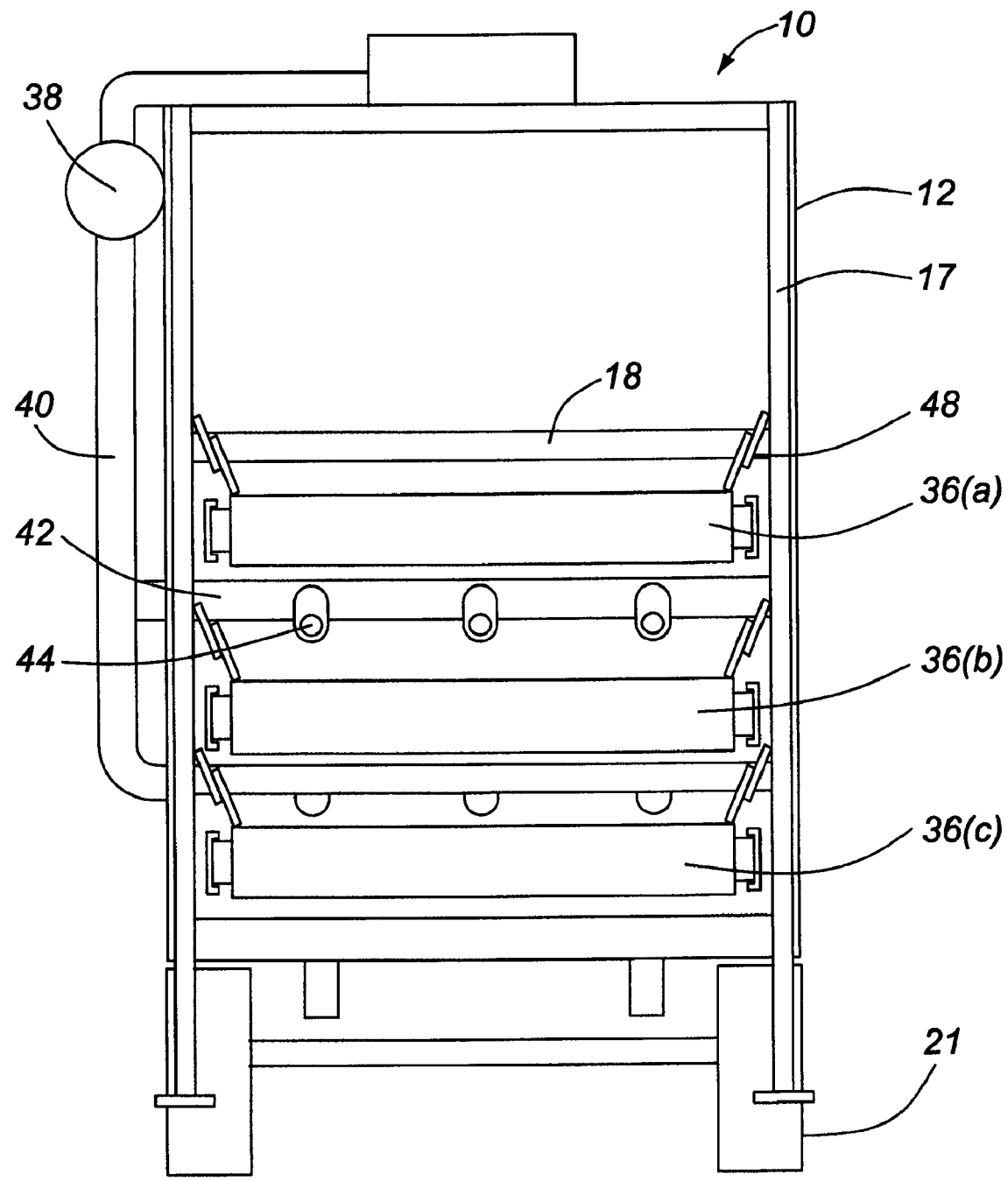
FIG. 4 is a schematic cutaway rear end view of an embodiment of the Air deck unit.
Figure 5:
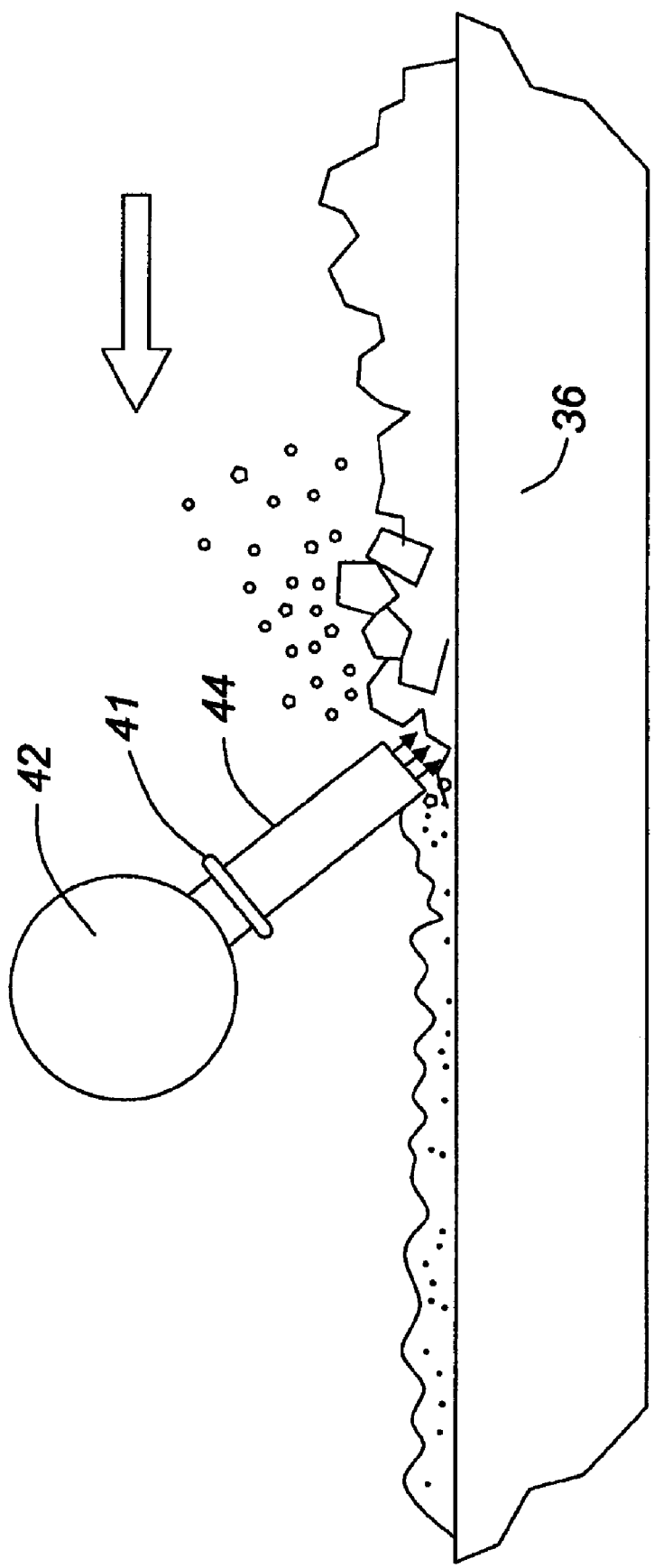
FIG. 5 is a schematic detailed view of the interface between an air nozzle and a conveyor of the soil remediation apparatus.
Figure 6:
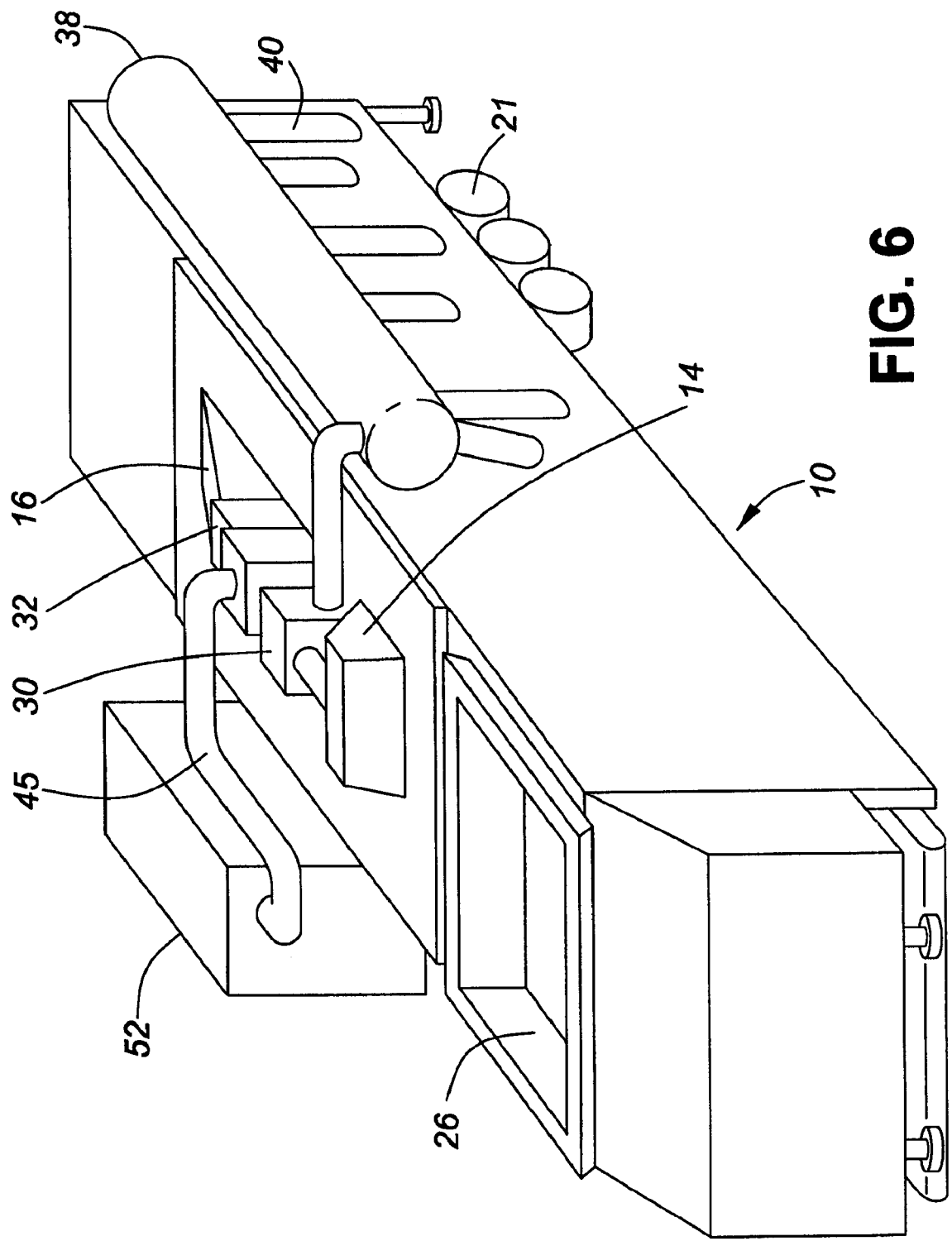
FIG. 6 is a schematic perspective view of the soil remediation apparatus.

Referring now to FIGS. 3 to 5, multiple air nozzles 44 are made of metal pipe and are attached to each air header 42 in a spaced array to form a nozzle assembly. In this embodiment, there are provided six nozzle assemblies each having an air header 42 with three laterally spaced nozzles 44. The nozzles assemblies are spaced along the bottom two conveyors 36(b), (c). However, a different number of header assemblies and a different number of nozzles 44 per header 42 can be selected at the preference of the designer and depending on the properties of the soil to be treated. For example, when treating sand, a first header 42 can contain five spaced nozzles 44, the next downstream header 42 can contain six spaced nozzles 44, and the next downstream header 42 can contain five spaced nozzles. The nozzles 44 can be staggered to move the sand and expose as much sand as possible to the recirculated air.

The air nozzles 44 blow air into the soil to aerate the soil, which helps to volatilize the contaminants trapped therein. The nozzles 44 also are positioned to plow the soil as it travels along the conveyors 36(b), (c), thereby agitating the soil to help volatilize the contaminants trapped therein.

As shown in FIG. 5, air nozzles 44 are connected to the nozzle headers 42 by means of a flanged joint 41 so as to facilitate quick replacement when necessary. The nozzles 44 extend from the header 42 at an angle towards the conveyor 36(b), (c). This angle, the shape and sizing of the nozzles 44, the spacing between the distal end of the nozzles 44 and the conveyor 36(b), (c), and the lateral spacing between nozzles 44 are selected to ensure that the nozzles 44 contact enough soil to cause sufficient aeration but not cause the soil to build up and clog up at each header. In this embodiment, the nozzles 44 have equal lateral spacing; however other spacing patterns, nozzle end treatments, nozzle angle and other nozzle parameters can be varied within the scope of the invention. Also in this embodiment, each nozzle 44 is a metal pipe with a 2" diameter opening (2⅜" outside diameter) mounted at 45 degrees to the horizontal. The end of each nozzle 44 terminates at an angle slightly greater than 45 degrees such that the leading edge of the pipe is slightly closer to the conveyor surface than the trailing edge. In this embodiment, there is a ½" clearance between the nozzle leading edge and the conveyor surface, and ¾ to 1" clearance between the nozzle trailing edge and the conveyor surface. This configuration reduces the tendency of soil from entering into the nozzle opening and clogging the nozzle.

The conveyors 36(a)-(c) are installed on sliding support structures such that they can be easily removed from the apparatus 10 for cleaning and repair. The conveyors 36(a)-(c) are powered by hydraulic, variable speed motors (not shown). Typically, the motors used are low speed/high torque variable speed motors, as are well known in the art. Each conveyor 36(b)-(c) has a belt with a width that spans substantially the width of the enclosure 11; the belt width can be varied at the preference of the designer. Optionally, the conveyor units 36 are corrugated to enhance retention of soil during conveyor motion.

Conveyor skirts 48 are installed along the longitudinal edges of the conveyor units 36(a)-(c). The conveyor skirts 48 are made of strips of rubber and metal as is well known in the art. The conveyor skirts 48 serve to help prevent soil from falling off the edges of the conveyor units 36(a)-(c). Also, the conveyor skirts 48 prevent recirculated air from escaping through the gap between the conveyor units 36 and the side of the enclosure 11. This increases the contact between the recirculated air and the contaminated soil, and consequently increases contaminant volatilization. The skirts 48 also help to seal each conveyor to the enclosure 11, thus forcing the recirculated air to travel the full length of the conveyor back to the suction hood 14. Without the skirts 48, some of the recirculated air could travel vertically along the enclosure 11 body back to the suction hood 14, thus degrading the aeration process.

Air Deck Unit Operation

In operation, the soil remediation apparatus is located near a site where contaminated soil is to be treated. As the soil is treated ex-situ by the apparatus, a loader (not shown) is used to excavate the contaminated soil and deliver it to the Air deck unit 10. The loader drops the soil into the hopper 26, which directs the soil on to the topmost conveyor unit 36(a) (the first conveyor unit"). The hopper 26 spans the full internal width of the enclosure 11 and adds to the soil storage capacity of the apparatus 10. This allows the loader to continuously feed contaminated soil into the apparatus 10. The first conveyor unit 36(a) transports the contaminated soil longitudinally through the enclosure 11. When the soil is deposited onto the first conveyor unit 36(a), the soil spreads out onto the conveyor's surface, thereby exposing more soil to air while inside the enclosure 11; such exposure increases the air-soil interface thereby increasing the rate of volatilization while the soil travels on the conveyor 36(a). A hydraulically controlled feed gate 28 is positioned above the first conveyor unit 36(a) near the hopper 26 and controls the depth of contaminated soil that is allowed to travel along the conveyor units 36. The hopper 26 is suitable for fine grained solids that do not contain large aggregates and/or sandy materials and/or silty materials. Processing of materials containing any large aggregates would be accomplished by pre-screening with a deck type screener that's common in the aggregate processing industry or by fitting either a "tipping grizzly" or "grizzly bars" to the top of the hopper to prevent large aggregates from entering the Air-Deck. Such pre-screen equipment is commonly used equipment that is commercially available from numerous suppliers.

While the contaminated soil travels along the conveyor units 36(a)-(c), it comes into contact with recirculated air, which helps to dry out the contaminated soil and volatilize the soil's contaminants. Drying the soil makes it easier for the air nozzles 44 to break the soil apart. The soil falls off the end of the first conveyor unit 36 and lands on the middle conveyor unit 36(b) (the "second conveyor unit"). The second conveyor unit 36(b) runs in the opposite direction as the first conveyor unit 36(a) and is positioned such that it catches soil that falls off the end of the first conveyor unit 36(a). While being transported by the second conveyor unit 36(b), the soil comes into contact with the first set of nozzle assemblies. As described above, the air nozzles 44 plow through the soil thereby agitating the soil and helping to volatize contaminants trapped therein and to break apart lumps of soil. Also, the air blown through the nozzles aerate the soil and also help in the volatilization process. Optionally, the air can be heated and dried to further enhance the volatilization process. Optionally but not shown, the air can be heated and/or dehumidified by heater(s) and dehumidifier(s).

At the end of the second conveyor unit 36(b), the soil again drops to the bottommost conveyor unit 36(c) (the "third conveyor unit"), which operates in the same direction as first conveyor unit 36(a) and is positioned to catch all the soil that falls off the end of the second conveyor unit 36(b). As on second conveyor unit 36(b), the soil is exposed to recirculated air and is aerated and agitated by the air nozzles 44 in each nozzles assembly. After the soil falls off the end of the third conveyor unit 36(c), one pass through the apparatus 10 is complete. The remediated soil is discharged from the air deck unit 10 through an remediated soil outlet 70 at the rear of the enclosure 11, and is deposited in a pile at the end of the third conveyor unit 36(c). If necessary, the discharged soil can be returned to the apparatus 10 for further treatment if further remediation is required.

Figure 7:
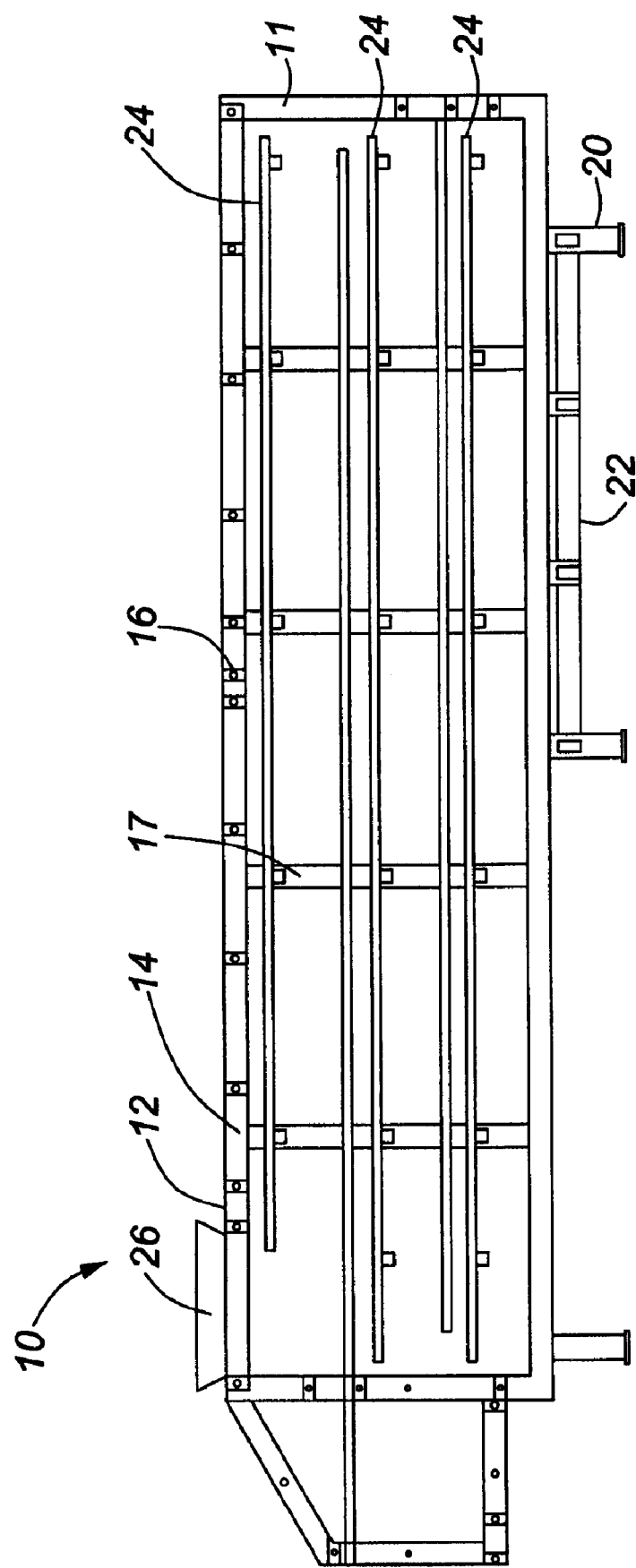
FIG. 7 is a cutaway side elevation view of certain components of the Air deck unit according to an alternative embodiment.

Referring to FIG. 7, a heating circuit 24 can be optionally placed within the enclosure 11 to supply heat for volatilizing the contaminated soil. In this embodiment, the heating circuit comprises heating fluid pipes 24 supported by the structural supports 18 and which extend longitudinally within the enclosure 11. Alternatively or additional, the heating fluid pipes 24 can extend transversely between the sides of the enclosure 11 (not shown). Heating fluid can be hot water or steam or another heating fluid as known in the art, and is supplied to the pipes 24 by a heating fluid source such a boiler (not shown). Optionally, the temperature within the enclosure 11 may be controlled by thermostat control system (not shown).

Heat improves the functionality of the apparatus 10 in a number of ways. First, heat enhances volatilization of soil contaminants. Liquids have a tendency to evaporate to a gaseous form, and all gases have a tendency to condensate back to a liquid; the addition of heat trends to assist in the evaporation of a liquid and cooling tends to assist with condensation of a gas. Second, the heating circuit 24 enables the apparatus 10 to be used in cold climates or during cold seasons. Third, the heating tubes 24 warm the contaminated air that is extracted from the enclosure 11, which aids in bioremediating the contaminated air.

Referring now to FIGS. 2 to 4, the apparatus 10 may also comprise stabilizing jacks 46, support legs 20, wheels 21, and an axle support frame 22. The stabilizing jacks 46 are hydraulically operated and raise the apparatus 10 for loading if the apparatus 10 is not equipped with axles 22 for transport. The support legs 20 are mounted to the exterior of the frame of the enclosure 11 and are designed to support the increased weight of the apparatus 10 when it is filled with contaminated soil. The wheels 21 may be used to increase the mobility of the apparatus 10 in transporting it from various locations on the same remediation site or from site-to-site. The axle support frame 22 can be fabricated to accommodate either a conventional tandem or a Tridem axle setup.

The apparatus 10 may include a nitrogen flood system (not shown), which automatically releases nitrogen gas into the enclosure 11 if the concentration of volatilized contaminants increases beyond a specified Lower Explosive Level. The nitrogen gas is inert and safely dilutes the volatilized contaminants such that their concentration declines below the Lower Explosive Level and, consequently, makes it so that the contaminants are no longer at risk for explosion. A large quantity of nitrogen gas is stored in a nitrogen storage header under pressure. Connected to this supply of nitrogen gas are injection tubes that extend to various locations within the enclosure 11.

Biofilter Unit

Contaminated air is extracted by the extracted air blower 32 and exits the enclosure 11 through the suction hood 16. The contaminated air travels through a conduit 45 to the biofilter unit 52 for bioremediation. The biofilter unit 52 contains biomass selected to bioremediate the volatilized contaminants that are fed into the biofilter 52 by the extracted air blower 32. The biomass includes a blend of silage, compost, wood chips and fertilizer material. A suitable biofilter container structure and biomass composition are commercially available, and thus are not described in detail here.

While FIG. 1 shows a single biofilter unit 52, additional biofilter units (not shown) can be provided depending on the bioremediation capacity required. When multiple biofilter containers are required, the conduit downstream of the extracted air blower 32 can be branched to each of the biofilter units.

While a particular embodiment of the present invention has been described in the foregoing, it is to be understood that other embodiments are possible within the scope of the invention and are intended to be included herein. It will be clear to any person skilled in the art that modifications of and adjustments to this invention, not shown, are possible without departing from the spirit of the invention as demonstrated through the exemplary embodiment. The invention is therefore to be considered limited solely by the scope of the appended claims.

I claim:

1. A soil remediation apparatus comprising:
   an air deck unit comprising
   (a) an enclosure with a contaminated soil inlet and a remediated soil outlet;
   (b) at least one belt conveyor located inside the enclosure and operable to convey soil along a conveying direction from the enclosure inlet to the enclosure outlet;
   (c) contaminated air extraction means having an inlet in fluid communication with the enclosure and an outlet, and operable to extract air from the air deck unit; and
   (d) air recirculation means having an inlet and outlet in fluid communication with the enclosure, and operable to extract and discharge air from and into the enclosure, thereby volatilizing contaminant vapours trapped therein;
   wherein the air recirculation means further comprises at least one nozzle assembly coupled to the outlet and comprising a header and a nozzle protruding from the header, the nozzle being directed at the belt conveyor and against the conveying direction such that air is discharged at the soil, thereby aerating the soil and volatilizing contaminants trapped therein; and wherein the nozzle is located in sufficient proximity to the belt conveyor that the nozzle will contact at least some soil conveyed along the belt conveyor such that the contacted soil is agitated and vapors trapped therein are volatilized.

2. A soil remediation apparatus as claimed in claim 1 wherein the nozzle assembly comprises multiple nozzles attached in transversely spaced manner to the header.

3. A soil remediation apparatus as claimed in claim 2 wherein the nozzle assembly is coupled to means for heating air traveling through the nozzle assembly.

4. A soil remediation apparatus as claimed in claim 2 wherein the nozzle assembly is coupled to a dehumidifier for dehumidifying air traveling through the nozzle assembly.

5. A soil remediation apparatus as claimed in claim 2, wherein the nozzles are spaced from each other in a horizontal direction perpendicular to the conveying direction.

6. A soil remediation apparatus as claimed in claim 1 wherein the nozzle has a leading edge directed against the conveying direction, and a trailing edge, and the leading edge is closer to the belt conveyor surface than the trailing edge.

* * * * *